United States Patent
Khanlarov et al.

(10) Patent No.: US 10,387,887 B2
(45) Date of Patent: Aug. 20, 2019

(54) BLOOM FILTER DRIVEN DATA SYNCHRONIZATION

(71) Applicant: SugarCRM Inc., Cupertino, CA (US)

(72) Inventors: Greg Khanlarov, Sunnyvale, CA (US); Matthew Marum, Raleigh, NC (US)

(73) Assignee: SUGARCRM INC., Cupertino, CA (US)

( * ) Notice: Subject to any disclaimer, the term of this patent is extended or adjusted under 35 U.S.C. 154(b) by 524 days.

(21) Appl. No.: 14/994,135

(22) Filed: Jan. 12, 2016

(65) Prior Publication Data
US 2017/0199921 A1 Jul. 13, 2017

(51) Int. Cl.
*G06F 16/00* (2019.01)
*G06Q 30/00* (2012.01)
*G06F 16/23* (2019.01)
*G06F 16/27* (2019.01)

(52) U.S. Cl.
CPC ......... *G06Q 30/01* (2013.01); *G06F 16/2358* (2019.01); *G06F 16/27* (2019.01)

(58) Field of Classification Search
CPC ......... G06F 17/30575; G06F 17/30345; G06F 17/30867; G06F 16/27; G06F 16/2358; G06Q 30/01
See application file for complete search history.

(56) References Cited

U.S. PATENT DOCUMENTS

| | | | | |
|---|---|---|---|---|
| 6,574,742 B1 * | 6/2003 | Jamroga | ............. | G06F 17/3028 705/2 |
| 2005/0033588 A1 * | 2/2005 | Ruiz | .................... | G06Q 10/06 705/35 |
| 2014/0344934 A1 * | 11/2014 | Jorgensen | ............... | G06F 21/56 726/24 |
| 2017/0177269 A1 * | 6/2017 | Beard | .................. | G06F 3/0647 |

* cited by examiner

*Primary Examiner* — Alexander Khong
(74) *Attorney, Agent, or Firm* — Steven M. Greenberg, Esq.; Shutts & Bowen LLP

(57) ABSTRACT

Embodiments of the present invention provide a method, system and computer program product for Bloom filter driven data synchronization. In an embodiment of the invention, a method for Bloom filter driven data synchronization includes adding different items of data in a source repository to a destination repository, inserting an entry for each of the added items in one or more Bloom filters, detecting a request for data synchronization of the source and destination repositories and responding to the data synchronization request by determining a set of data items to be synchronized based upon changed data items in the source repository, testing each of the data items in the set against the Bloom filter, and performing data synchronization between both repositories only in respect to those data items in the set that specified by the Bloom filter to be in the destination repository.

12 Claims, 2 Drawing Sheets

BLOOM FILTER DRIVEN DATA SYNCHRONIZATION

BACKGROUND OF THE INVENTION

Field of the Invention

The present invention relates to data synchronization and more particularly to Bloom filter driven data synchronization.

Description of the Related Art

1. Data Synchronization

Data synchronization is the process of establishing consistency among data from a source to a target data storage and vice versa and the continuous harmonization of the data over time. Data synchronization is fundamental to a wide variety of applications, including file synchronization and mobile device synchronization. Data synchronization on the small scale involves determining which items between two different repositories have changed since a previous exercise in data synchronization and the updating of each repository only with the most recent update of each data item so as to ensure that each repository is an identical duplicate of the other. As will be recognized, however, while synchronizing small amounts of data between repositories can consume a minimum amount of processing resources, synchronizing repositories of large amounts of data can be both time consuming and resource intensive.

2. Bloom Filters

A Bloom filter is a space-efficient probabilistic data structure that can be used to determine whether or not an item is contained within a set. Bloom filters have a characteristic that while a Bloom filter may return a false positive at a known rate, the Bloom filter never returns a false negative. Essentially, then, in response to a query, a Bloom filter may return either a "possibly in the set" or a "definitely not in set". Notably, Bloom filters can be used as a filter for very large sets, easily millions of items, while utilizing relatively small amounts of storage. Bloom filters rely on a series of hash functions that are thus non-reversible, that flip a fixed number of bits within a fixed size data structure. The size of the data structure can be tuned to an acceptable accuracy rate given the number of values being tracked.

BRIEF SUMMARY OF THE INVENTION

Embodiments of the present invention address deficiencies of the art in respect to data synchronization and provide a novel and non-obvious method, system and computer program product for Bloom filter driven data synchronization. In an embodiment of the invention, a method for Bloom filter driven data synchronization includes adding different items of data in a source repository to a destination repository, inserting an entry for each of the added items in one or more Bloom filters, detecting a request for data synchronization of the source and destination repositories and responding to the data synchronization request by determining a set of data items to be synchronized based upon changed data items in the source repository, testing each of the data items in the set against the Bloom filter, and performing data synchronization between both repositories only in respect to those data items in the set that specified by the Bloom filter to be in the destination repository.

In one aspect of the embodiment, the response to the data synchronization request further includes discarding any data item received during synchronization in the destination repository that is not already present in the destination repository. In another aspect of the embodiment, the different items of data are added to the destination repository based upon one or more data warehousing rules present in the source repository. In yet another aspect of the embodiment, the source repository is a data repository of customer relationship management (CRM) data managed in a CRM data processing system and the destination repository is a data warehouse archiving selected ones of the CRM data based upon data warehousing rules specified in the CRM data processing system.

In another embodiment of the invention, a data processing system is configured for Bloom filter driven data synchronization. The system includes a host computing system with at least one computer with memory and at least one processor. The system also includes fixed storage coupled to the host computing system and supporting a source repository for data for an application executing in the host computing system. Finally, the system includes a data synchronization module executing in the memory of the host computing platform. The module includes program code enabled upon execution in the host computing system to add different items of data in the source repository to a destination repository coupled to the source repository from over a computer communications network, to insert an entry for each of the added items in one or more Bloom filters established in the fixed storage, to detect a request for data synchronization of the source and destination repositories, and to respond to the data synchronization request by determining a set of data items to be synchronized based upon changed data items in the source repository, testing each of the data items in the set against the Bloom filter, and performing data synchronization between both repositories only in respect to those data items in the set that specified by the Bloom filter to be in the destination repository.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for Bloom filter driven data synchronization. In accordance with an embodiment of the invention, data in a source repository is added to a destination repository. Whenever an item of data is added to the destination repository, an entry for the item of data is added to a Bloom filter. Thereafter, during data synchronization of the source and destination repositories, a set of data items to be synchronized is determined based upon changed data items in the source repository. But, each of the data items in the set first are tested against the Bloom filter. Only data items specified by the Bloom filter to be in the destination repository are then synchronized between the source and destination repositories. To the extent that any data items in the set are synchronized to the destination repository, but are not present already in the destination repository, those records are discarded at the destination repository.

Figure 1:
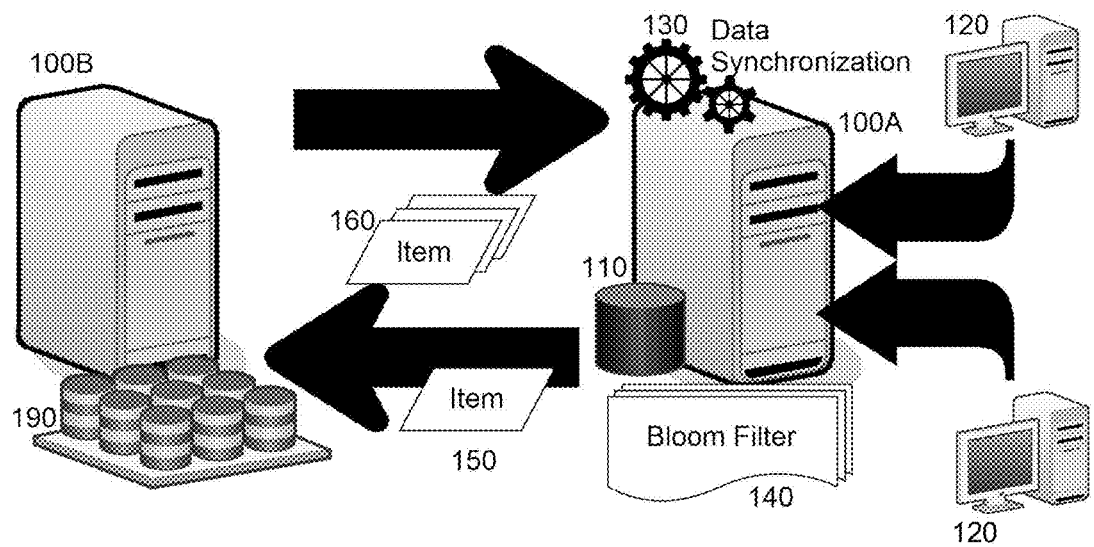
FIG. 1 is a pictorial illustration of a process for Bloom filter driven data synchronization.

In further illustration, FIG. 1 pictorially shows a process for Bloom filter driven data synchronization. As shown in FIG. 1, a host computing system 100A includes a source repository of data 110 and is communicatively coupled to a target computing system 100B in which a destination repository 190 such as a data warehouse is implemented. Different items of data 150 from the source repository 110 are added to the destination repository 190 and whenever an item 150 is added to the destination repository 190 from the source repository 110, an entry is written to a Bloom filter 140, for example in connection with a globally unique identifier (GUID) for the corresponding item 150. Thereafter, data items are modified in the source repository 110 through the interactions of one or more computing clients 120 interacting with the host computing system 100A.

Of note, data synchronization logic 130 operates in the host computing system 100A. The data synchronization logic 130 responds to a request to synchronize data between the source repository 110 and the destination repository 190 by first determining a set of data items 160 that have been modified by way of the interactions of the computing clients 120 and thus are subject to data synchronization with the destination repository 190. Subsequently, the data synchronization logic 130 subjects each data item in the set 160 to the Bloom filter 140 so as to reduce the set 160 to only those data items in for which the Bloom filter 140 indicates are present. The remaining data items are filtered from the set 160. Finally, only those remaining items in the set 160 are synchronized with the destination repository 190.

Figure 2:
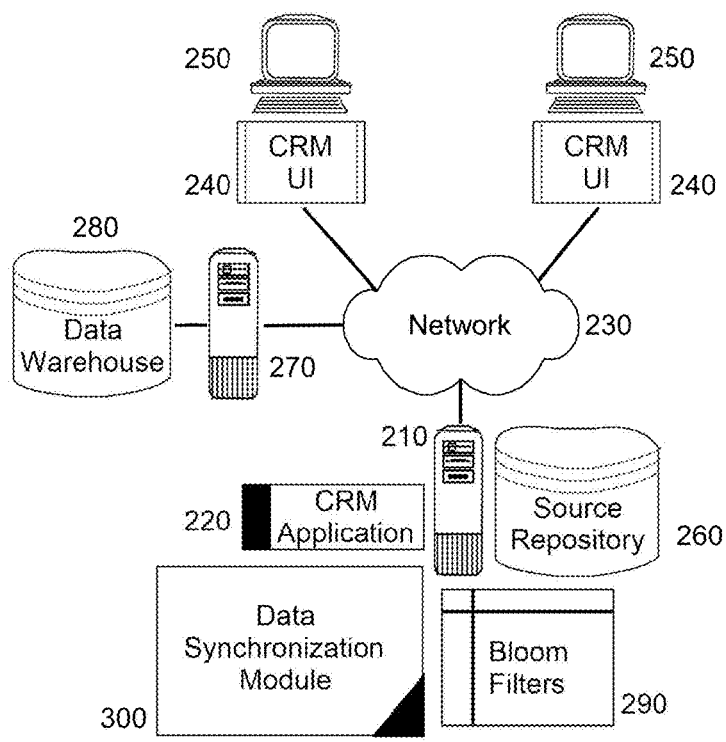
FIG. 2 is a schematic illustration of a data processing system configured for Bloom filter driven data synchronization; and, FIG. 3 is a flow chart illustrating a process for Bloom filter driven data synchronization.

The process described in connection with FIG. 1 is implemented in a data processing system. In further illustration, FIG. 2 schematically shows a data processing system configured for Bloom filter driven data synchronization. The system includes a host computing system 210. The host computing system 210 includes one or more computers, each with memory and at least one processor (only a single computer shown for ease of illustrative simplicity). The host computing system 210 supports the execution of a CRM application 220 that is accessed from over computer communications network 230 by different CRM user interfaces 240 operating in respectively different client computers 250. Through each CRM user interface 240, CRM data in a source repository 260 is created, modified, and deleted.

Of note, the CRM data in the source repository 260 is replicated offsite to a remote computing system 270 implementing a data warehouse 280. That is, one or more rules disposed in fixed storage of the host computing system 210 specify when data items of CRM data in the source repository 260 are to be copied to the data warehouse 280. As such, whenever a data item of CRM data in the source repository 260 is copied to the data warehouse 280, an entry is inserted in a Bloom filter 290 in the host computing system 210.

Importantly, a data synchronization module 300 is coupled to the CRM application 220 and executes in the memory of the host computing system 210. The data synchronization module 300 includes program code that, upon execution in the host computing system 210, is enabled to detect a request in the CRM application 220 for data synchronization of CRM data in the source repository 260 and CRM data in the data warehouse 280, and to respond to the data synchronization request by determining a set of data items in the source repository to be synchronized. This determination is performed by the program code of the module 300 by testing each of the data items in the set against the Bloom filter 290, and performing data synchronization between the source repository 260 and the data warehouse 280 only in respect to those data items in the set that specified by the Bloom filter 290 to be in the data warehouse 280.

Figure 3:
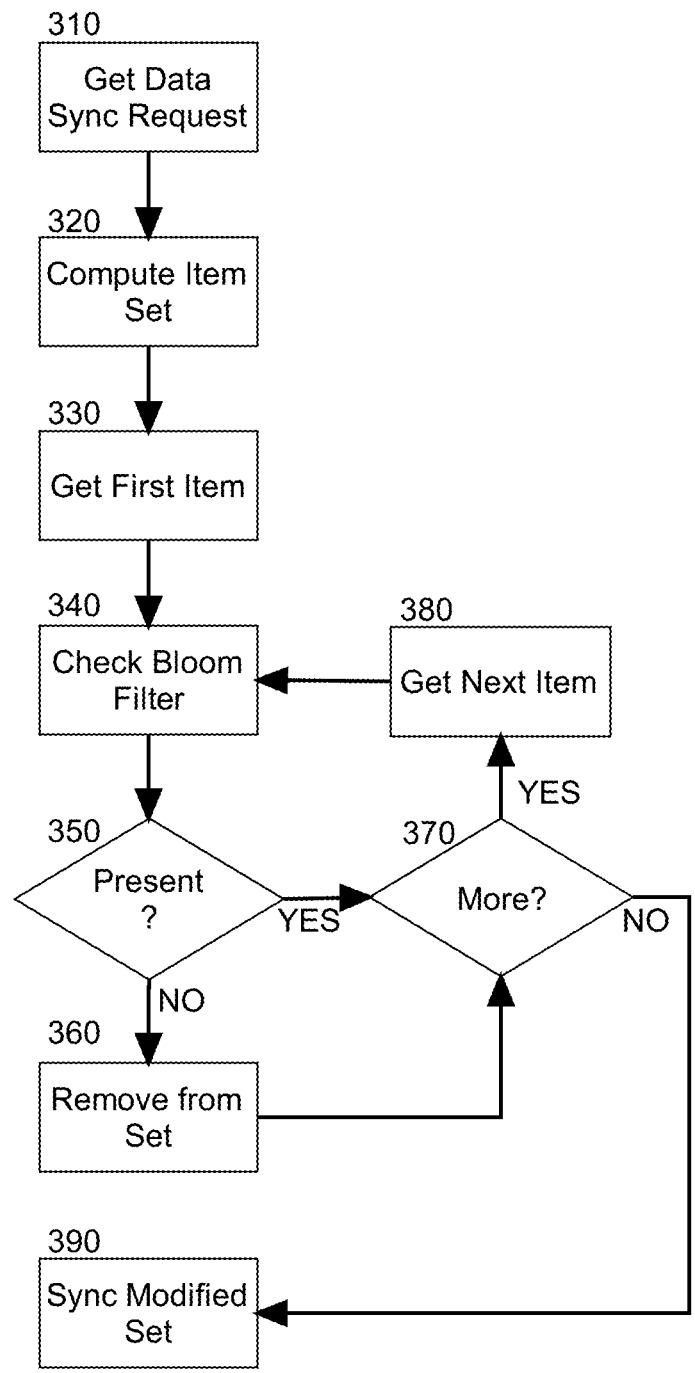

In even yet further illustration of the operation of the data synchronization module 300, FIG. 3 is a flow chart illustrating a process for Bloom filter driven data synchronization. Beginning in block 310, a data synchronization request is received for synchronizing data as between a source repository such as a CRM data store of a CRM application, and a destination repository such as a data warehouse warehousing selective items of CRM data in the source repository. In block 320, a set of CRM data items to be synchronized is determined, for example based upon an inventory of CRM data items in the source repository that have changed since a last data synchronization. Therefore, the process continues through block 330.

In block 330, a first item in the set is selected for processing and in block 340, the first item is tested against the Bloom filter. In decision block 350 it is determined if the first item is present in the Bloom filter. If not, the first item is removed from the set in block 360. Subsequently, in block 370 it is determined if more data items remain to be tested in the set. If so, in block 380 a next data item in the set is selected and once again, the next data item is tested against the Bloom filter. As before, if in decision block 350 it is determined that the next items is not present in the Bloom filter, in block 360 the next item also is removed from the set. In decision block 370, when no more items in the set remain to be tested against the Bloom filter, in block 390 a data synchronization is performed between the source repository and the data warehouse for only those data items remaining in the set.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the user's computer, as a stand-alone software package, partly on the user's computer and partly on a remote computer or entirely on the remote computer or server. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

1. A method for Bloom filter driven data synchronization, the method comprising:
    adding different items of data in a source repository to a destination repository;
    inserting an entry for each of the added items in one or more Bloom filters;
    detecting a request for data synchronization of the source and destination repositories; and,
    responding to the data synchronization request by determining a set of data items to be synchronized based upon changed data items in the source repository, testing each of the data items in the set against the one or more Bloom filters, and performing data synchronization between both repositories only in respect to those data items in the set that specified by the one or more Bloom filters to be in the destination repository.

2. The method of claim 1, further comprising, discarding any data item received during synchronization in the destination repository that is not already present in the destination repository.

3. The method of claim 1, wherein the different items of data are added to the destination repository based upon one or more data warehousing rules present in the source repository.

4. The method of claim 1, wherein the source repository is a data repository of customer relationship management (CRM) data managed in a CRM data processing system and the destination repository is a data warehouse archiving selected ones of the CRM data based upon data warehousing rules specified in the CRM data processing system.

5. A data processing system configured for Bloom filter driven data synchronization, the system comprising:
    a host computing system comprising at least one computer with memory and at least one processor;
    fixed storage coupled to the host computing system and supporting a source repository for data for an application executing in the host computing system; and,
    a data synchronization module executing in the memory of the host computing platform, the module comprising program code enabled upon execution in the host computing system to add different items of data in the source repository to a destination repository coupled to the source repository from over a computer communications network, to insert an entry for each of the added items in one or more Bloom filters established in the fixed storage, to detect a request for data synchronization of the source and destination repositories, and to respond to the data synchronization request by determining a set of data items to be synchronized based upon changed data items in the source repository, testing each of the data items in the set against the one or more Bloom filters, and performing data synchronization between both repositories only in respect to those data items in the set that specified by the one or more Bloom filters to be in the destination repository.

6. The system of claim 5, wherein the program code is further configured to respond to the data synchronization request by discarding any data item received during synchronization in the destination repository that is not already present in the destination repository.

7. The system of claim 5, wherein the different items of data are added to the destination repository based upon one or more data warehousing rules present in the source repository.

8. The system of claim 5, wherein the application is a customer relationship management (CRM) application and wherein the source repository is a data repository of CRM data managed in the CRM application and the destination repository is a data warehouse archiving selected ones of the CRM data based upon data warehousing rules specified in the CRM application.

9. A computer program product for Bloom filter driven data synchronization, the computer program product comprising a non-transitory computer readable storage medium having program instructions embodied therewith, the program instructions executable by a device to cause the device to perform a method comprising:

adding different items of data in a source repository to a destination repository;

inserting an entry for each of the added items in one or more Bloom filters;

detecting a request for data synchronization of the source and destination repositories; and, responding to the data synchronization request by determining a set of data items to be synchronized based upon changed data items in the source repository, testing each of the data items in the set against the one or more Bloom filters, and performing data synchronization between both repositories only in respect to those data items in the set that specified by the one or more Bloom filters to be in the destination repository.

10. The computer program product of claim 9, wherein the method further comprises, discarding any data item received during synchronization in the destination repository that is not already present in the destination repository.

11. The computer program product of claim 9, wherein the different items of data are added to the destination repository based upon one or more data warehousing rules present in the source repository.

12. The computer program product of claim 9, wherein the source repository is a data repository of customer relationship management (CRM) data managed in a CRM data processing system and the destination repository is a data warehouse archiving selected ones of the CRM data based upon data warehousing rules specified in the CRM data processing system.

* * * * *